(No Model.)

A. ERNST.
COVER FOR MILK OR OTHER CANS.

No. 533,876.             Patented Feb. 12, 1895.

WITNESSES:

INVENTOR

Alexander Ernst

BY

ATTORNEYS.

United States Patent Office.

ALEXANDER ERNST, OF NEW YORK, N. Y.

COVER FOR MILK OR OTHER CANS.

SPECIFICATION forming part of Letters Patent No. 533,876, dated February 12, 1895.

Application filed June 27, 1894. Serial No. 515,822. (No model.)

*To all whom it may concern:*

Be it known that I, ALEXANDER ERNST, a citizen of the United States, residing in the city of New York, county and State of New York, have invented certain new and useful Improvements in Covers for Milk or other Cans, of which the following is a specification.

This invention is designed to supply for domestic purposes an improved cover that can be used on the different sizes of condensed-milk-cans, fruit-cans, &c., to close them after they are opened, and protect thereby the contents of the cans against flies, &c.; and the invention consists of a cover for condensed milk and other cans, which is composed of two main parts, a stepshaped lower portion and an arch- or convex cap-shaped portion, the lower portion being provided at its upper end with an upwardly-projecting and slitted flange on which the detachable cap-portion is tightly fitted. The cap-portion is likewise made step-shaped, so as to be adapted for the two different sizes of condensed milk-cans in use, while the lower portion is adapted for the different sizes of fruit-cans.

Figure 1:
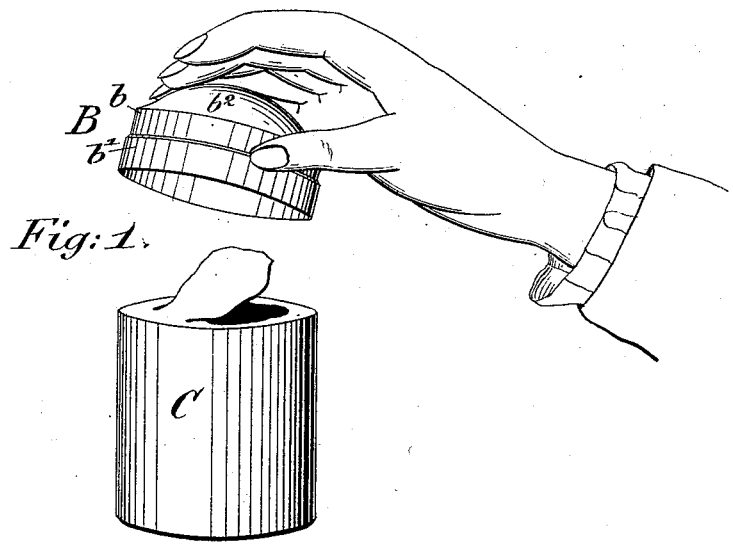
Figure 2:
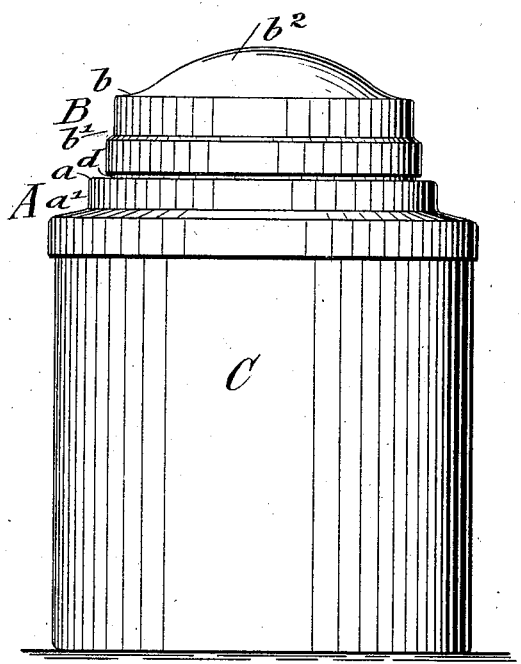
Figure 3:
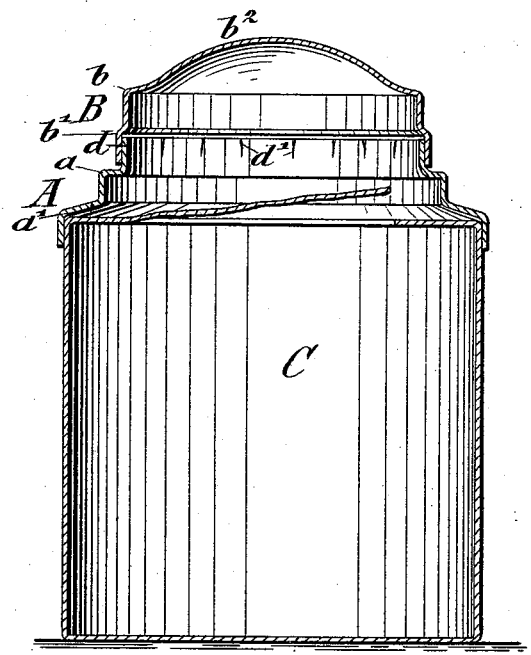

In the accompanying drawings, Figure 1 represents a perspective view of a condensed milk-can, shown in the act of applying my improved cover to the same. Fig. 2 is a side elevation of a can with my improved cover, and Fig. 3 is a vertical central section of the same, Fig. 2.

Similar letters of reference indicate corresponding parts.

Referring to the drawings, A represents the base or lower and B the upper or cap-portion of my improved cover for condensed milk, fruit and other cans C. The lower and cap-portions are made from tin, sheet-iron, aluminum, or other suitable sheet-metal, which is non-corrodible, so as not to be attacked by the contents of the can. The lower, as well as the cap-portion, is provided with two rectangular steps $a$, $a'$, and $b$, $b'$, respectively, which are pressed by means of dies into the metal, and which correspond in diameter to the ordinary sizes respectively of fruit and milk-cans on the market. The lower portion is furthermore provided at its upper edge with an upwardly-bent flange $d$, which is provided at suitable distances apart with slits $d'$, so that a certain spring action is imparted to the flange, by which the cap-portion can be tightly fitted on the lower portion. The cap-portion is provided with an arched or convex middle portion $b^2$, the upper step of the same serving as a handle in holding and applying the cover-portion B. Seldom need the cover be made other than of the annular form shown, but I do not limit myself thereto, as the same may be of square or other form according to the form of the can to which it is to be applied.

When my improved cover is used for fruit-cans, both portions must be used together,—that is to say, the cap-portion must be placed on the slitted flange of the lower portion, the whole being then applied to the fruit-can, the lower step for the larger and the second step for the smaller sizes of fruit-cans.

When the cover is used for condensed milk cans, the cap-portion only is used, as the steps of the same correspond to the two sizes of condensed milk-cans on the market.

My improved cover is intended for use in the household, as one is enabled thereby to cover the condensed milk, fruit or other can, when the same has been opened, and exclude thereby the air, flies, &c., so as to keep the contents of the same in good condition for a longer time than can be done at present. By the use of the cover, the contents of such milk and other cans can be preserved for several days without any deterioration of the same.

Having thus described my invention, I claim as new, and desire to secure by Letters Patent—

1. A cover for condensed milk, fruit and other cans, consisting of an upper and a lower part, separable from each other, said lower part being composed of a step-shaped base-portion, having a circumferential yielding flange on its upper edge, and said upper part being composed of a cap-portion, substantially as set forth.

2. A cover for condensed milk-cans, consisting of an upper and a lower part separable from each other, said lower part being composed of a step-shaped body having steps of different diameters, and said upper part being composed of a cap-portion having an arched or convex top, substantially as set forth.

In testimony that I claim the foregoing as my invention I have signed my name in presence of two subscribing witnesses.

ALEXANDER ERNST.

Witnesses:
 PAUL GOEPEL,
 K. R. BRENNAN.